Patented Oct. 17, 1939

2,176,593

UNITED STATES PATENT OFFICE 2,176,593

MANUFACTURE OF MERCAPTO-ARYL-THIAZOLES

William E. Messer, Cheshire, Conn., assignor, by mesne assignments, to United States Rubber Company, New York, N. Y., a corporation of New Jersey No Drawing. Application May 27, 1937,
Serial No. 145,038

3 Claims. (Cl. 260—306)

The present invention relates to the manufacture of mercapto-aryl-thiazoles.

There are various known methods of making mercapto-aryl-thiazoles (arylene thiazyl sulphides), but most of them either require high temperatures and pressures or costly or corrosive materials. Even in the best processes, the yields are far from quantitative, many side reactions taking place. Furthermore the quality of the crude materials obtained are low and purification steps are necessarily included.

It is an object of the present invention to provide a process obviating one or more of the above disadvantages. Further objects will be apparent below.

The invention comprises treating a solution of a metallic salt of trithiocarbonic acid with an amino-aryl sulphide. The amino-aryl sulphides are mercaptan compounds, broadly thiophenols having an amino substituent in the aryl nucleus in the ortho position and may embody one or more mercapto sulphur atoms. The 1-mercaptobenzothiazole (American nomenclature) is prepared from aniline disulphide (o,o'-diamino diphenyl disulphide).

When aniline and sulphur are heated together hydrogen sulphide is evolved and crude o,o'-diamino diphenyl disulphide is formed. This reaction product may be further treated in the crude state, or it may first be purified to recover unreacted aniline and/or sulphur. For example, unreacted aniline may be recovered by distillation and the residue dissolved in dilute hydrochloric acid, filtered from unreacted sulphur, and neutralized to precipitate pure o,o'-diamino diphenyl disulphide,—or the residue may be taken up in alcohol and the alcohol solution filtered from unreacted sulphur.

Other methods of purification may also be used instead.

The o,o'-diamino diphenyl disulphide (purified or unpurified) is then reacted with alkali trithiocarbonate. The reaction takes place quantitatively in boiling alcohol solution during an hour. It takes place in cold alcohol solution during several hours. It takes place in boiling water during 24 hours. Hydrogen sulphide is evolved during the reaction.

The alkali trithiocarbonate may be prepared by treating an alkali sulphide with carbon disulphide. In the case of sodium sulphide the reaction is as follows:

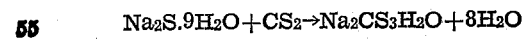

The sulphides of other metals may also be used for the reaction.

The principal reaction is illustrated as follows:

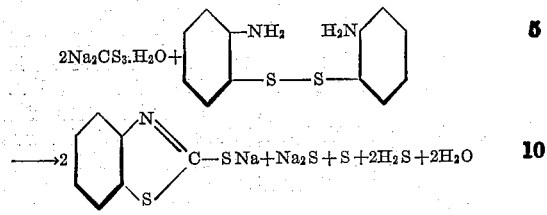

The ratio of the reacting reagents in 2 moles of the alkali salt of trithiocarbonic acid to 1 mole of the diamino diaryl disulphide (or equivalently 2 moles of the corresponding parent amino thiophenol).

The invention is of general application to the homologues and analogues of aniline, further substituted or not, for the preparing of the corresponding mercapto-aryl thiazoles, e. g. mercapto-tolyl thiazole, mercapto-xylyl-thiazole, mercapto-naphthothiazole, etc.

The invention is illustrated with a preferred embodiment of the invention in the following examples, the parts being by weight:

Example I

Two hundred thirty-eight (238) parts of sodium sulphide (hydrated crystals) are dissolved in 1000 parts of ethyl alcohol and 76 parts of carbon disulphide are added. About 172 parts of trithiocarbonate (hydrate) are formed in solution.

To this alcoholic solution are added 124 parts of o,o'-diamino diphenyl disulphide and the solution brought to a boil and boiled for 1 hour. Reaction commences upon addition of the disulphide; hydrogen sulphide is evolved in a steady stream and may be absorbed in an appropriate absorber. At the end of 1 hour the alcohol is evaporated recovering alcohol and the residue taken up in water and the solution filtered from a small amount (about 12 parts) of free sulphur. Upon acidification of the filtrate, as by adding 103 parts of concentrated $H_2SO_4$ (or the equivalent of dilute acid), filtering off the precipitate, washing and drying, 164 parts of 1-mercaptobenzothiazole of melting point of 173–180° C. are obtained. This corresponds to a yield of over 98% of theory based on either sodium trithiocarbonate or o,o'-diamino diphenyl disulphide used. The purity indicated by the melting point is approximately 99%.

Under the above conditions, the temperature does not exceed about 80° C. and the time of reaction is only about one hour. No autoclave or pressure vessel is needed.

When the alcohol solution of the disulphide and the trithiocarbonate are allowed to stand at room temperature for about 4 hours instead of boiling, about 144 parts of a cruder grade of the mercaptobenzothiazole results.

The reaction may be carried out in other organic solvents than alcohol, or even in water solution as shown by the following example. Generally the solvent should dissolve at least to some extent the reagents employed, and since the operating temperatures will depend on the boiling point of the solvent employed, it is preferred to use a solvent having a boiling point between room temperature and about 200° C.

*Example II*

Two hundred forty (240) parts of sodium sulphide (hydrated crystals) are dissolved in 1000 parts of water and 75 parts of carbon bisulphide added and stirred, until dissolved.

Two hundred forty-eight (248) parts of o,o'-diamino diphenyl disulphide are added and the whole refluxed for 24 hours. $H_2S$ evolved is absorbed. About 5 parts of NaOH are added, the solution filtered from free sulphur, the filtrate acidified, and the precipitate filtered off, washed and dried. One hundred forty-nine (149) parts of 1-mercaptobenzothiazole are obtained of melting point of 166-177° C. This corresponds to a yield of about 90% of some 95% pure material.

Other substituted disulphides, as for example 2,2'-diamino-5,5'-dimethyl diphenyl disulphide, or o-amino thiophenols, such as 2-mercapto-3-amino toluene, may be used with sodium trithiocarbonate or other alkali trithiocarbonate to produce other mercapto aryl thiazoles.

Many embodiments of the invention may be made without departing from the spirit of the invention, and it is intended to cover all aspects of the invention in view of the prior art and as indicated by the appended claims.

Havng thus described my invention, what I claim and desire to protect by Letters Patent is:

1. A process which comprises reacting in alcoholic solution at least 2 moles of an alkali salt of trithiocarbonic acid with at least one mole of o,o'-diamino diphenyl disulphide, whereby to form an alkali salt of mercaptobenzothiazole, evaporating off the alcohol, removing free sulphur after precipitation of the same from an aqueous solution of said salt, and subsequently recovering the mercaptobenzothiazole after precipitation of the same on acidification of the aqueous solution of said salt.

2. A process of making a mercapto-aryl-thiazole compound which comprises reacting together a preformed metallic salt of trithiocarbonic acid with an amino-aryl sulphide chosen from the class consisting of the benzene and naphthalene series having an amino group ortho to a mercapto sulphur atom, which reaction is carried out in the presence of an organic solvent for said reagents.

3. A process of making a mercapto-aryl-thiazole compound which comprises reacting together in an organic solvent solution a preformed alkali salt of trithiocarbonic acid with an ortho-amino-phenyl sulphide.

WILLIAM E. MESSER.